US012769391B2

(12) United States Patent
Hsieh et al.

(10) Patent No.: US 12,769,391 B2
(45) Date of Patent: Oct. 20, 2026

(54) DISPLAY PANEL OPERATION BASED ON EYE GAZE PATTERNS

(71) Applicant: Hewlett-Packard Development Company, L.P., Spring, TX (US)

(72) Inventors: Hsing-Hung Hsieh, Taipei City (TW); Chi-Hao Chang, Taipei City (TW); Hui Leng Lim, Spring, TX (US); Andrew Rhodes, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/689,202

(22) PCT Filed: Sep. 16, 2021

(86) PCT No.: PCT/US2021/050727

§ 371 (c)(1),
(2) Date: Mar. 5, 2024

(87) PCT Pub. No.: WO2023/043446

PCT Pub. Date: Mar. 23, 2023

(65) Prior Publication Data

US 2024/0370086 A1 Nov. 7, 2024

(51) Int. Cl.
*G06F 3/01* (2006.01)
*G09G 5/10* (2006.01)

(52) U.S. Cl.
CPC ............... *G06F 3/013* (2013.01); *G09G 5/10* (2013.01); *G09G 2320/0686* (2013.01)

(58) Field of Classification Search
CPC ........ G06F 3/013; G06F 3/011; G06F 3/0482; G06F 3/04842; G06F 3/017; G06F 3/04845; G06F 3/012; G06F 3/1204; G06F 3/04815; G06F 3/1242; G02B 27/0172; G02B 2027/0118; G02B 2027/0138; G02B 27/0093; G02B 2027/014; G06T 2219/2016; G06T 19/006; G09G 2320/0626; G09G 2354/00; G09G 2330/021
See application file for complete search history.

(56) References Cited

U.S. PATENT DOCUMENTS

| | | | | |
|---|---|---|---|---|
| 7,068,813 | B2 | 6/2006 | Lin | |
| 10,665,204 | B1 * | 5/2020 | Goodsitt | G09G 5/10 |
| 2007/0273714 | A1 | 11/2007 | Hodge et al. | |
| 2012/0288139 | A1 | 11/2012 | Singhar | |
| 2013/0249410 | A1 | 9/2013 | Thompson | |
| 2014/0204016 | A1 | 7/2014 | Plowman | |
| 2015/0145777 | A1 * | 5/2015 | He | G06V 40/193 348/78 |

(Continued)

*Primary Examiner* — Sujit Shah
(74) *Attorney, Agent, or Firm* — Quarles & Brady LLP

(57) ABSTRACT

In some examples, a computer-readable medium storing executable code which, when executed by a processor of an electronic device, causes the processor to store a relationship between a user eye gaze pattern and first conditions of the electronic device, identify second conditions of the electronic device, determine whether the second conditions match the first conditions, and responsive to the second conditions matching the first conditions, selectively operate a display panel of the electronic device with differing display characteristics based on the user eye gaze pattern.

21 Claims, 9 Drawing Sheets

(56) References Cited

U.S. PATENT DOCUMENTS

| | | | | |
|---|---|---|---|---|
| 2015/0234457 | A1* | 8/2015 | Kempinski | G06V 40/19<br>345/156 |
| 2016/0231810 | A1* | 8/2016 | Imoto | G06F 3/04842 |
| 2017/0154369 | A1* | 6/2017 | Yu | G06Q 30/06 |
| 2018/0239442 | A1* | 8/2018 | Noda | G06F 3/013 |
| 2018/0321740 | A1* | 11/2018 | Bryson | G06F 3/013 |
| 2020/0191643 | A1 | 6/2020 | Davis | |
| 2021/0082371 | A1* | 3/2021 | Novelli | G09G 5/10 |
| 2021/0263586 | A1* | 8/2021 | Wang | G06F 3/017 |
| 2021/0318751 | A1* | 10/2021 | Connor | G06F 3/011 |
| 2021/0341998 | A1* | 11/2021 | Sun | G06T 5/94 |
| 2022/0011858 | A1* | 1/2022 | Li | G06F 3/013 |

* cited by examiner

DISPLAY PANEL OPERATION BASED ON EYE GAZE PATTERNS

BACKGROUND

Display panels may display images using a variety of technologies, such as liquid crystal displays (LCDs), light emitting diode displays (LEDs), quantum dot LED displays (QLEDs), organic LED displays (OLEDs), and others. Many display panel technologies enable different portions of the screen to provide different levels of brightness. For example, a central area of the display panel may be illuminated more brightly than a peripheral area of the display panel.

BRIEF DESCRIPTION OF THE DRAWINGS

Various examples will be described below referring to the following figures.

DETAILED DESCRIPTION

Figure 1:
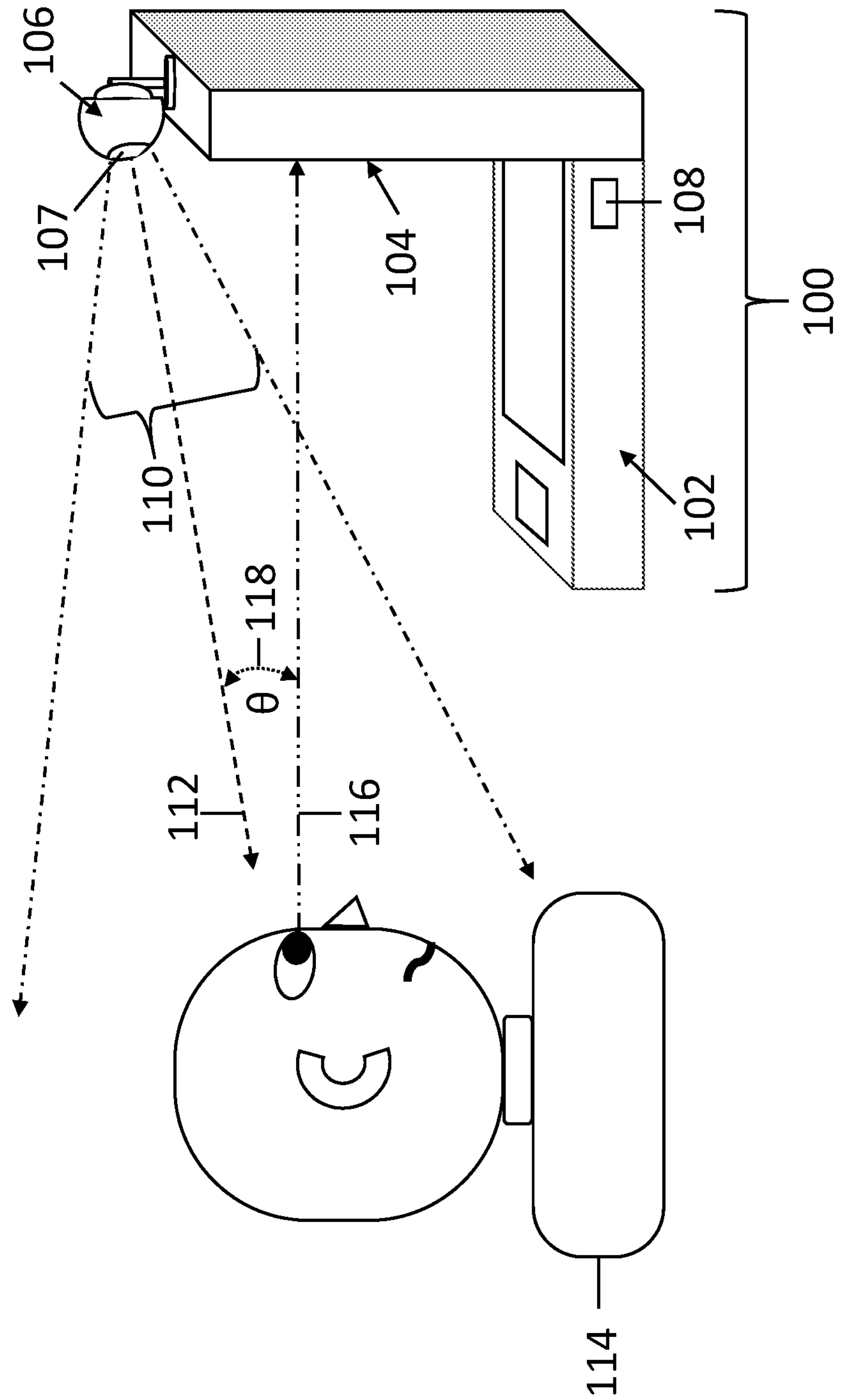
FIG. 1 is a schematic diagram of an electronic device to capture and identify a user eye gaze pattern under a set of electronic device conditions, in accordance with various examples.

Display panels may display images using a variety of technologies, such as liquid crystal displays (LCDs), light emitting diode displays (LEDs), quantum dot LED displays (QLEDs), organic LED displays (OLEDs), and others. Many display panel technologies provide different levels of brightness in different areas of the display panel. For example, a central area of the display panel may be illuminated more brightly than a peripheral area of the display panel.

Display panels that illuminate different areas with differing brightness levels mitigate the excessive power consumption caused by constant, uniform, high-brightness illumination of the display panel. However, such display panels suffer from multiple drawbacks. For example, such a display panel may enable illumination patterns that a user of the display panel did not intend. In addition, these display panels' illumination patterns are static, meaning that when a user switches applications or gazes at different parts of the display panel, the illumination pattern does not change to accommodate the user activity. This lack of accommodation diminishes user productivity.

Described herein are various examples of an electronic device that is to dynamically modify display panel illumination patterns based on conditions pertaining to the electronic device, such as a user's activity. The electronic device monitors the user's eye gaze as the user uses the electronic device under various conditions. For example, the electronic device may monitor the user's eye gaze while the user is using an e-mail application, a word processing application, a web browser, a spreadsheet application, etc. In this way, the electronic device identifies patterns (e.g., using machine learning techniques) in the user's eye gaze while the user is engaged in different activities under varying conditions. For instance, the electronic device may monitor the user's eye gaze over a period of time and determine that the user tends to focus her eye gaze on the center of the electronic device display panel when using an e-mail application, and that the user tends to focus her eye gaze on a left portion of the display panel when using a spreadsheet application. The electronic device may collect such user eye gaze data for a variety of conditions that extend beyond particular applications the user may be using. For example, the electronic device may identify patterns in the user's eye gaze relating to specific files that the user accesses, particular times of day, the relative brightness of the display panel to the environment, remaining battery life, whether the electronic device is coupled to mains power, and a range of other conditions that may relate to the user's eye gaze patterns. The electronic device may monitor the user eye gaze patterns and the specific conditions relating to those eye gaze patterns during a training period (e.g., hours, days, weeks, months, years). Machine learning techniques may be useful to identifying such user eye gaze patterns. The electronic device may then store the user eye gaze patterns and the specific conditions relating to those eye gaze patterns.

The electronic device subsequently monitors the conditions on the electronic device (e.g., user activity, ambient brightness, remaining battery life), and responsive to the monitored conditions matching any of the stored conditions, the electronic device uses the corresponding eye gaze pattern to selectively illuminate the display panel with varying brightness levels. For example, if, after the training period, the electronic device determines that the user is using a web browser, the electronic device may access the stored user eye gaze pattern associated with the user's prior use of the web browser and may selectively illuminate the display panel with differing brightness levels based on that eye gaze pattern. For instance, if in the past the user's eye gaze has fallen upon a central area of the display panel when using the web browser, the user's subsequent use of the web browser will cause the electronic device to apply a higher brightness level in the central area of the display panel and a lower brightness level in the peripheral area of the display panel. If the user then switches to a word processing application, the electronic device may determine that, in the past, the user's eye gaze has tended to fall upon a top quarter of the display panel. Accordingly, the electronic device may more brightly illuminate the top quarter of the display panel and more dimly illuminate the remainder of the display panel. In another example, the electronic device may determine that the user eye gaze pattern follows dynamic activity on the display panel, such as the movement and/or resizing of a window on the display panel. Accordingly, responsive to detecting similar dynamic activity (e.g., movement and/or resizing of a window), the electronic device may selectively brighten, dim, or otherwise alter aspects of the display panel based on the previously identified user eye gaze pattern.

In this way, the electronic device dynamically and selectively illuminates the display panel with differing brightness levels depending on the conditions in which the electronic device is used and the user's prior eye gaze patterns when those same (or similar) conditions were present. Such dynamic and selective illumination of the display panel reduces power consumption and enhances user productivity relative to other solutions.

FIG. 1 is a schematic diagram of an electronic device to capture and identify a user eye gaze pattern under a set of electronic device conditions, in accordance with various examples. Specifically, an electronic device 100 includes a chassis 102 and a display panel 104 (e.g., an OLED display panel). The electronic device 100 includes an image sensor 106, such as a web camera, which may be coupled to the chassis 102 by way of a connector 108 (connection not expressly shown), a wireless (e.g., BLUETOOTH®) connection, or any other suitable connection. The image sensor 106 includes a lens 107 through which the image sensor 106 captures images (e.g., videos, stills). The image sensor 106 has a field of view 110 and an optical axis 112. A user 114 of the electronic device 100 has a user eye gaze 116. An angle 118 separates the planes of the optical axis 112 and the user eye gaze 116. The electronic device 100 includes a processor (not expressly shown in FIG. 1, but shown in FIGS. 6 and 7 and described below) that is to continuously monitor the angle 118 of the user eye gaze 116 relative to the optical axis 112. The angle 118 provides the processor with information regarding the area(s) of the display panel 104 the user 114 is viewing. The angle 118 varies as the user eye gaze varies. Over a period of time, the processor identifies a user eye gaze pattern, which, as used herein, means the manner in which the user moves her eyes over the period of time to view areas of the display panel 104. While monitoring the user eye gaze over the period of time, the processor of the electronic device 100 monitors conditions of the electronic device 100, such as the application(s) being accessed by the user, specific files that the user accesses, the time(s) of day, the relative brightness of the display panel to the environment, remaining battery life, whether the electronic device is coupled to mains power, and a range of other conditions. The processor may store the user eye gaze pattern and the conditions of the electronic device 100 in storage (not expressly shown in FIG. 1, but shown in FIGS. 6 and 7 and described below) of the electronic device 100, such as in a data structure that cross-references specific user eye gaze patterns with specific conditions of the electronic device 100. For example, the data structure may cross-reference a user's eye gaze at a central area of the display panel 104 while the user accesses a web browser. For example, the data structure may cross-reference a user's eye gaze at a smaller central area of the display panel 104 while the user accesses a web browser and the remaining battery life is below a threshold. The period of time during which the processor captures and stores user eye gaze patterns and electronic device 100 conditions may be referred to as a training period. After the training period is complete, the processor of the electronic device 100 uses the captured and stored user eye gaze pattern and condition data to selectively operate different areas of the display panel 104. For example, when the user accesses the web browser, the electronic device 100 may increase the brightness level of a central area of the display panel 104 and decrease the brightness level of other areas of the display panel 104. In some examples, the electronic device 100 may operate the display panel 104 to adjust display characteristics of the central area of the display panel 104 and the other areas of the display panel 104, such as contrast, refresh rate, color calibration, hue, saturation, dimming ratio, etc. In some examples, the training period continues indefinitely.

Figure 2:
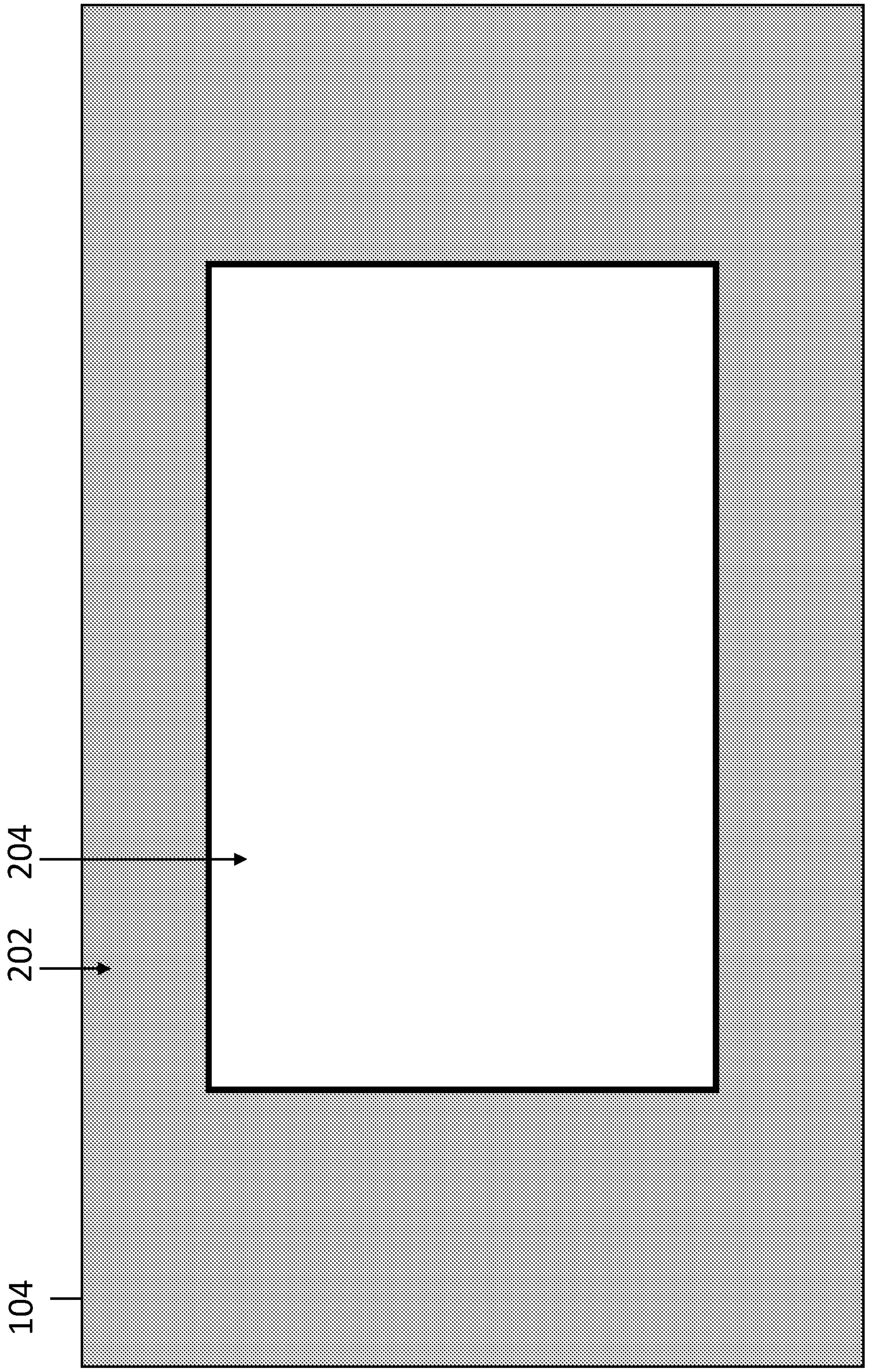
FIG. 2 is a diagram of a display panel using different display characteristics in different areas of the display panel, in accordance with various examples.
Figure 3:
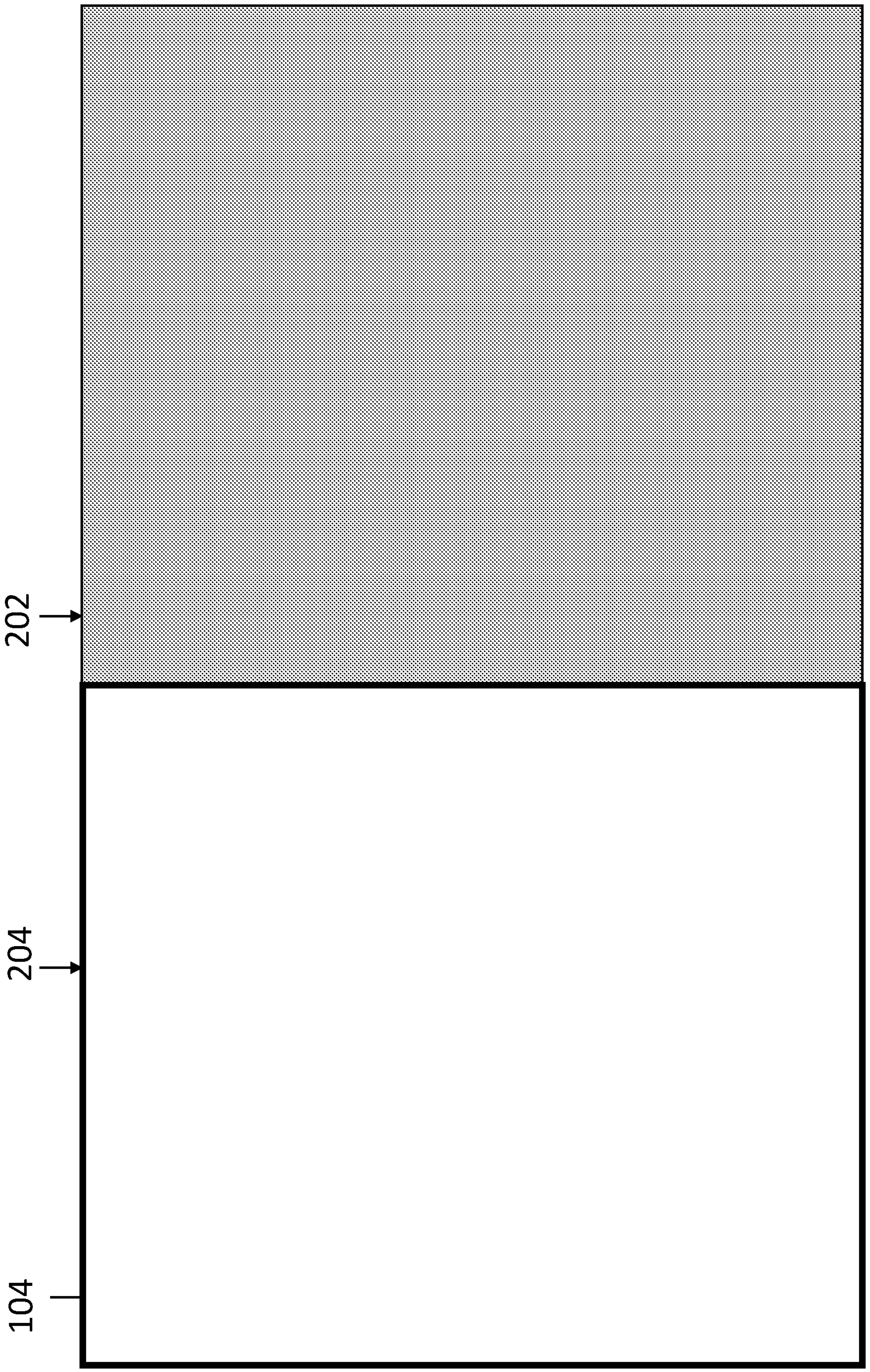
FIG. 3 is a diagram of a display panel using different display characteristics in different areas of the display panel, in accordance with various examples.
Figure 4:
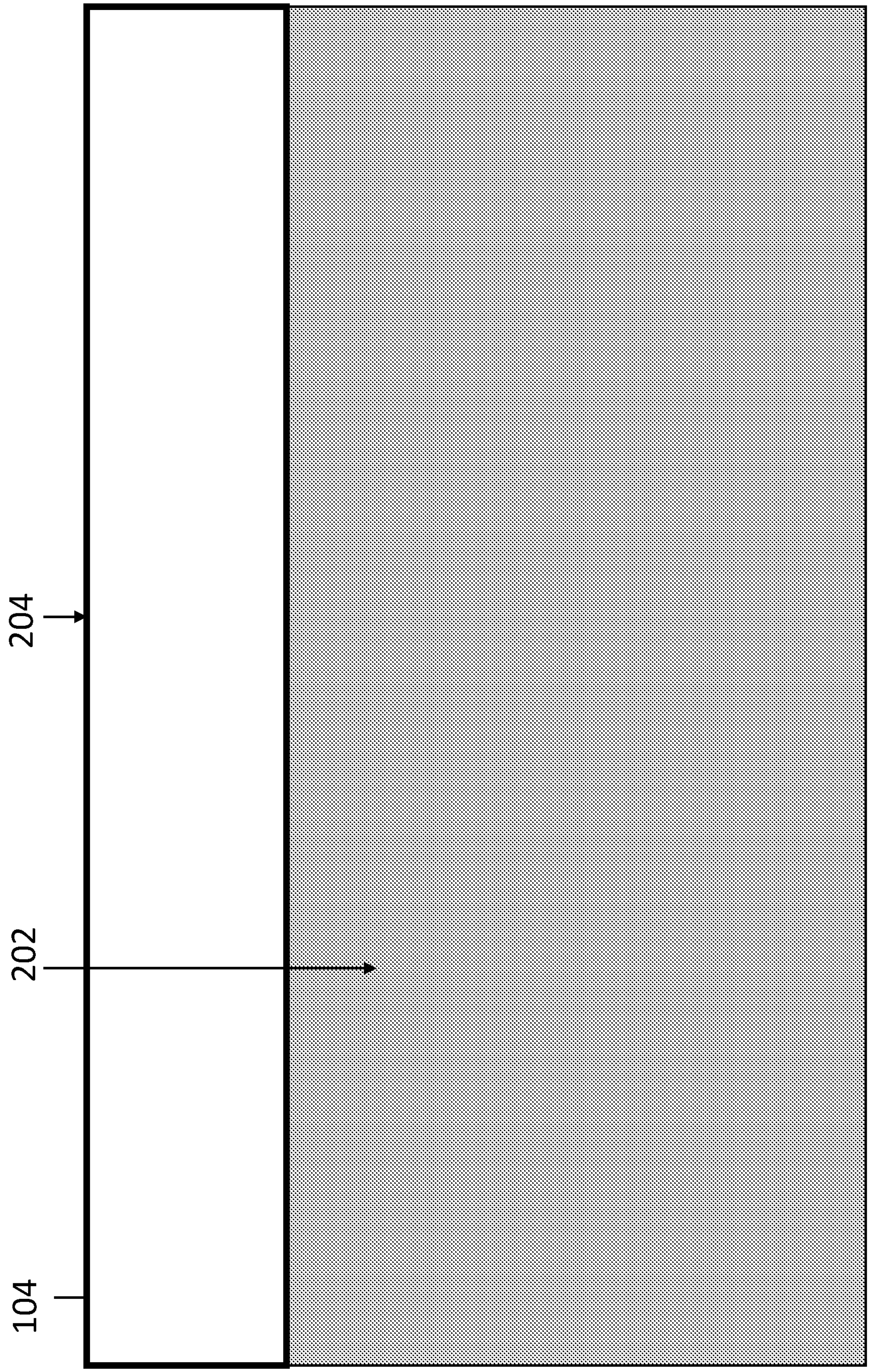
FIG. 4 is a diagram of a display panel using different display characteristics in different areas of the display panel, in accordance with various examples.
Figure 5:
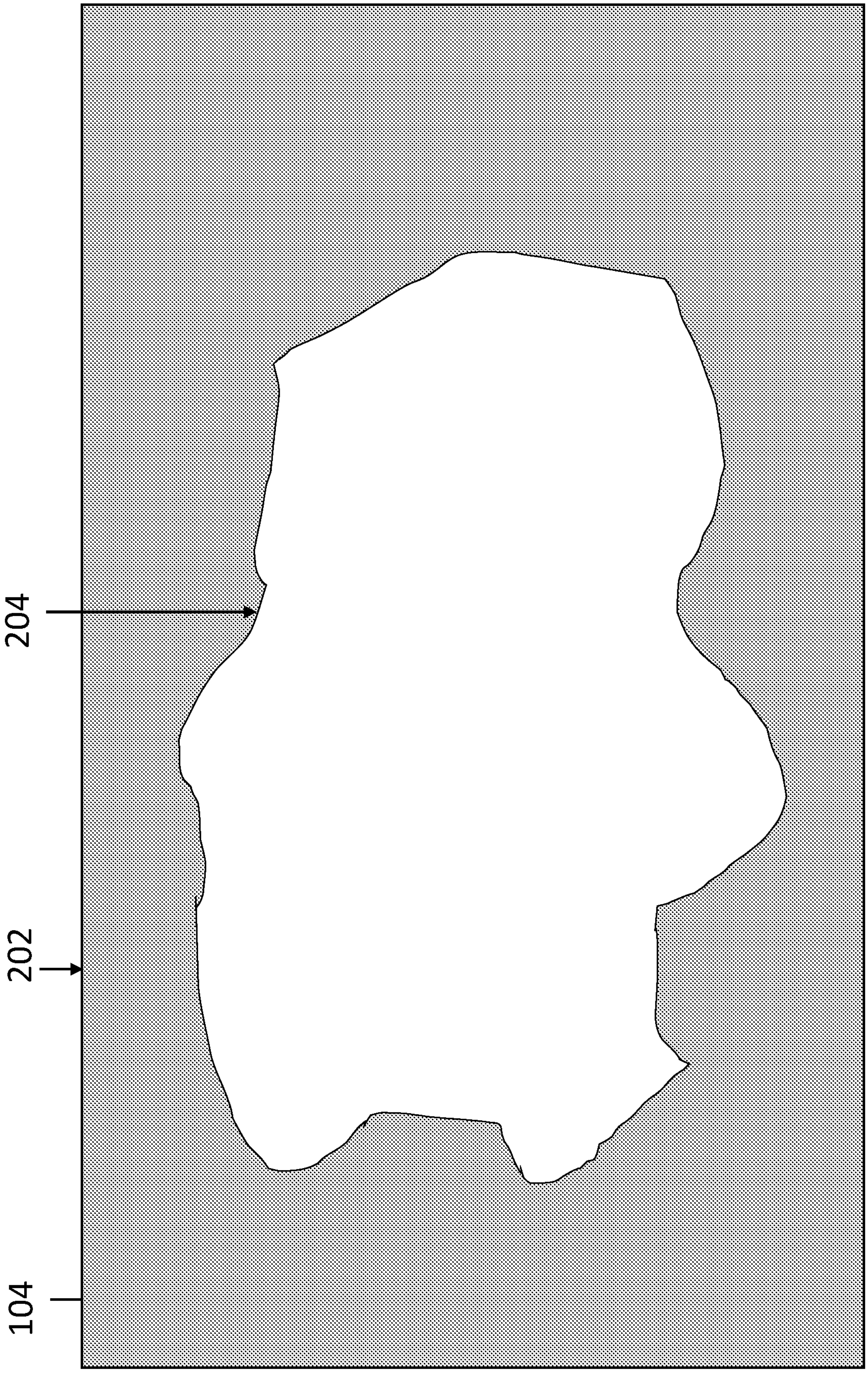
FIG. 5 is a diagram of a display panel using different display characteristics in different areas of the display panel, in accordance with various examples.

FIGS. 2-5 are diagrams of example display panels that are selectively operated to use different display characteristics in different areas of the display panels, depending on the conditions (also referred to herein as first conditions or target conditions) detected by the electronic device 100 after the training period. In particular, FIG. 2 depicts the display panel 104 having an area 202 and an area 204, and the areas 202 and 204 display content using different display characteristics. The contours of areas 202 and 204 are defined based on the user eye gaze patterns identified during the training period. For example, if the user's eye gaze is focused on a central one third of a display panel, the area 204 may correspond to the central one third of the display panel and may be displayed using particular display characteristics (e.g., greater brightness), while the remainder of the display panel corresponds to the area 202 and may be displayed using other display characteristics (e.g., lesser brightness). In examples, the areas 202, 204 may be illuminated according to a dimming ratio (e.g., a dimming ratio based on the ambient lighting surrounding the electronic device 100). In examples, content that would otherwise be displayed in area 204 may be invisible. In examples, the area 204 may have a different hue than the area 202. Other differences in display characteristics used to display content in the areas 202 and 204 are contemplated and included in the scope of this disclosure. The specific display characteristics used to operate different areas 202, 204 of the display panel 104 may be determined based on the conditions that are identified as being present (e.g., operational conditions reviewed at a particular time and/or in a particular state), such as the example conditions described above. FIGS. 3-5 depict various configurations of the areas 202 and 204. FIG. 5 in particular depicts irregular shapes for the areas 202 and 204. In some examples, more than two areas may be used, with each area operated according to different display characteristics.

Figure 6:
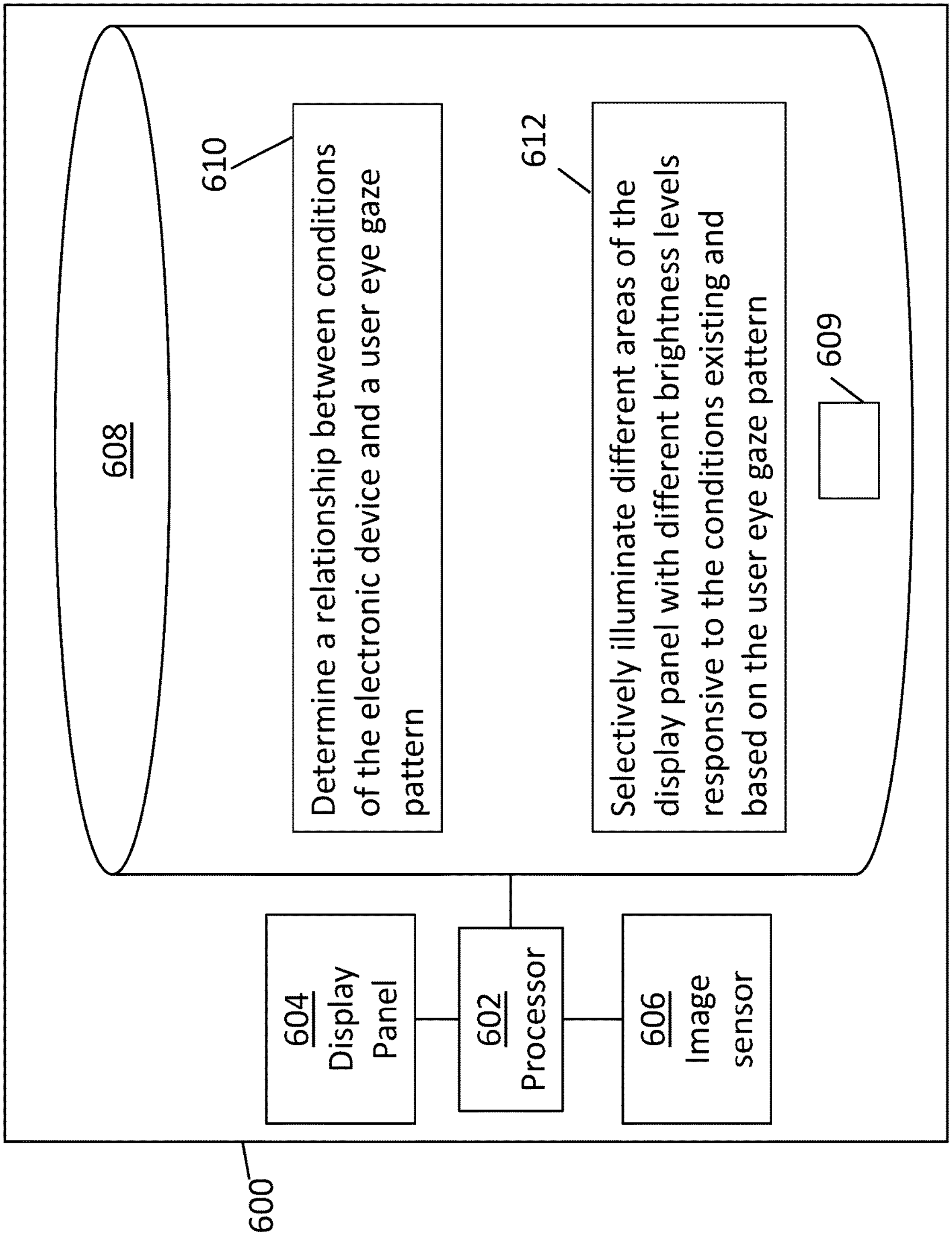
FIG. 6 is a block diagram of an electronic device to operate a display panel based on eye gaze patterns, in accordance with various examples.

FIG. 6 is a block diagram of an electronic device 600 to operate a display panel based on eye gaze patterns, in accordance with various examples. The electronic device 600 includes a processor 602, a display panel 604, an image sensor 606, a storage 608 (e.g., random access memory (RAM)), and instructions 610, 612. The processor 602, upon executing the instructions 610, 612, performs the instructions 610, 612. Execution of instruction 610 causes the processor 602 to determine a relationship between conditions of the electronic device 600 and a user eye gaze pattern. For example, the processor 602 may determine that when the user of the electronic device 600 is using a web browser in dim ambient lighting conditions and with a low battery level, the user's eye gaze tends to focus on the central area of the display panel 604. Thus, the processor 602 may populate a data structure 609 in the storage 608 cross-referencing conditions of the electronic device 600 (use of web browser, dim ambient lighting below a particular threshold, battery level below a particular threshold) with a user eye gaze pattern (a specific area of the center of the display panel 604 where the user's eye gaze focuses for the greatest time during a finite time period). The processor 602 may also cross-reference these conditions and user eye gaze pattern with particular display characteristics that are to be used on the display panel 604 should the same or similar conditions be detected in the future. For example, if the processor 602 detects the same or similar conditions as those recorded in the data structure 609 and described above, the processor 602 may apply the display characteristics recorded in the data structure 609 to different areas of the screen according to the user eye gaze pattern. For instance, the processor 602 may brightly illuminate a central area of the display panel 604 and dimly illuminate the remainder of the display panel 604.

Figure 7:
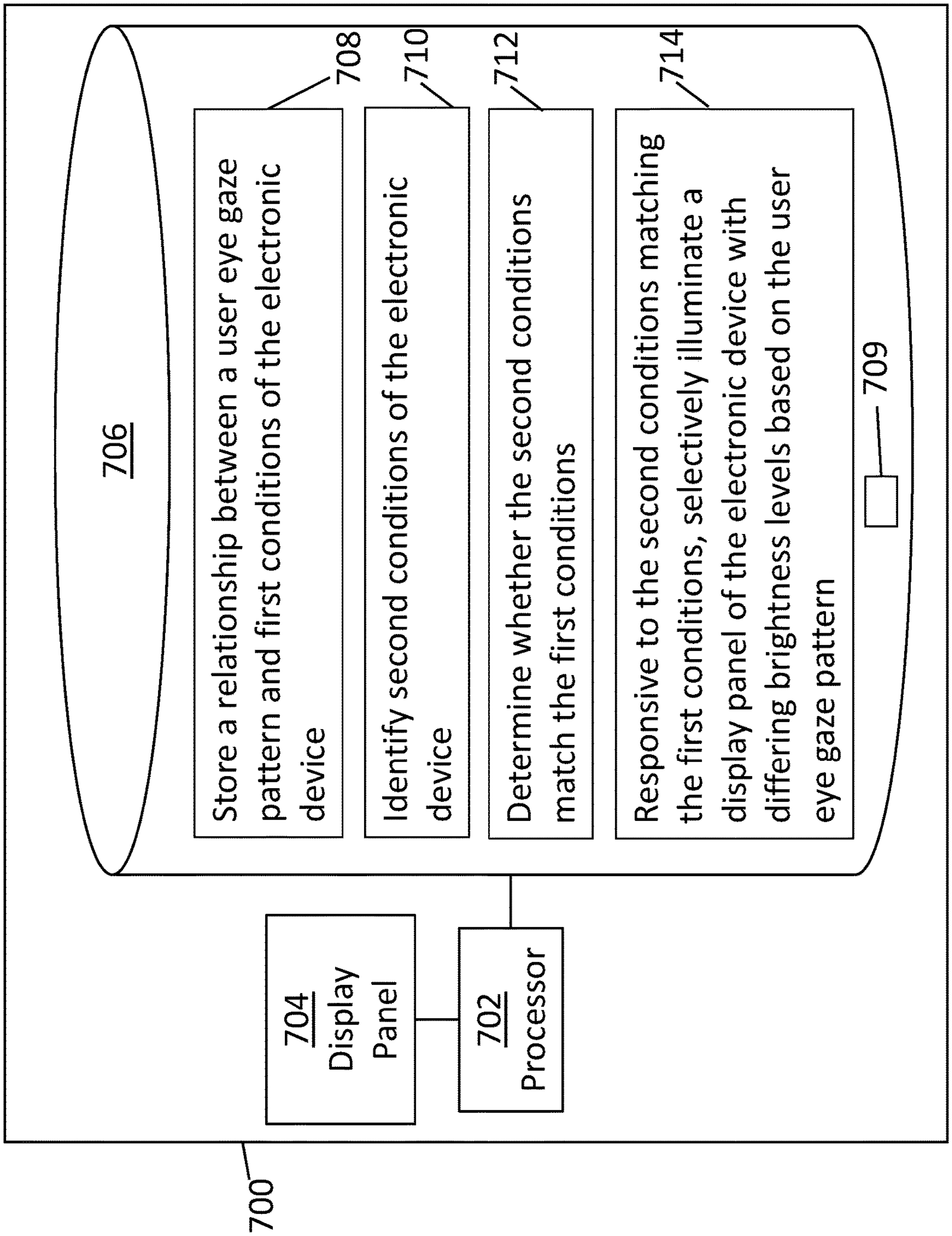
FIG. 7 is a block diagram of an electronic device to operate a display panel based on eye gaze patterns, in accordance with various examples.

FIG. 7 is a block diagram of an electronic device 700 to operate a display panel based on eye gaze patterns, in accordance with various examples. The electronic device 700 includes a processor 702, a display panel 704, and a storage 706 (e.g., RAM). The storage 706 includes instructions 708, 710, 712, and 714, as well as a data structure 709. The instructions in the storage 706, when executed by the processor 702, cause the processor 702 to perform the instructions. In particular, the processor 702 stores a relationship between a user eye gaze pattern and first conditions of the electronic device 700 (708). The relationship may be determined, for example, during a training period as described above. The processor 702 may store such a relationship in the data structure 709. The processor 702 identifies second conditions of the electronic device (710) and determines whether the second conditions match the first conditions (712). For example, the first conditions may include ambient lighting exceeding a particular range, and the second conditions may include ambient lighting exceeding the range. Responsive to the second conditions matching the first conditions, the processor 702 selectively illuminates the display panel 704 with differing brightness levels based on the user eye gaze pattern (714).

Figure 8:
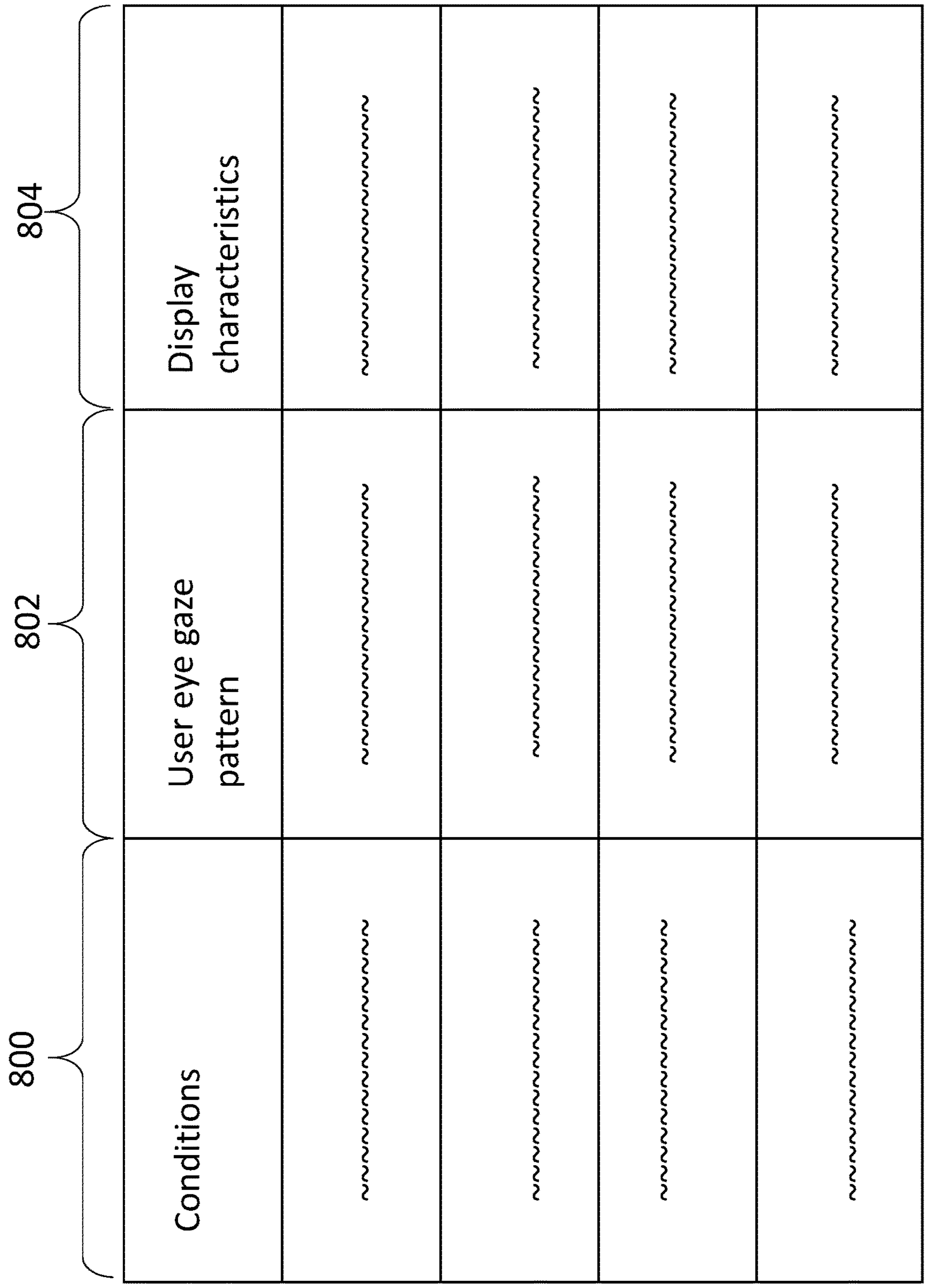
FIG. 8 is a diagram of a data structure to store electronic device conditions and user eye gaze patterns corresponding to the electronic device conditions, in accordance with various examples.

FIG. 8 is a diagram of a data structure to store electronic device conditions and user eye gaze patterns corresponding to the electronic device conditions, in accordance with various examples. The data structure of FIG. 8 is an example of the data structures 609, 709 described above. A data structure, as used herein, is a predefined format for storing, organizing, processing, and/or retrieving data in a storage device of a computer. The data structure may store data such as conditions 800 (e.g., lighting conditions, application being used, dynamic activity on the display panel such as movement and/or resizing of windows), user eye gaze patterns 802 (e.g., the areas of the display panel on which the user gaze tends to focus, and/or the static or dynamic behavior of the user gaze), and display characteristics 804 (e.g., brightness, dimness). Each row of the data structure cross-references a different condition(s) 800, user eye gaze pattern(s) 802, and display characteristic(s) 804. The data structure is populated by a processor (e.g., processor 602 of FIG. 6 or processor 702 of FIG. 7) of an electronic device (e.g., electronic device 600 of FIG. 6 or electronic device 700 of FIG. 7) during a training period as the processor collects data (e.g., conditions and user eye gaze patterns corresponding to those conditions) and stores the data to the data structure of FIG. 8 (e.g., data structure 609 of FIG. 6 or data structure 709 of FIG. 7). Further, the processor may store display characteristics 804 to the data structure that determines how the processor is to operate a display panel (e.g., display panel 604 of FIG. 6 or display panel 704 of FIG. 7) of the electronic device when the corresponding conditions exist. The display characteristics (e.g., dimming ratios) may be programmed or selected by the user or by any other suitable entity. In some examples, the display characteristics may be generated using machine learning techniques and programmed into the electronic device by a developer.

Figure 9:
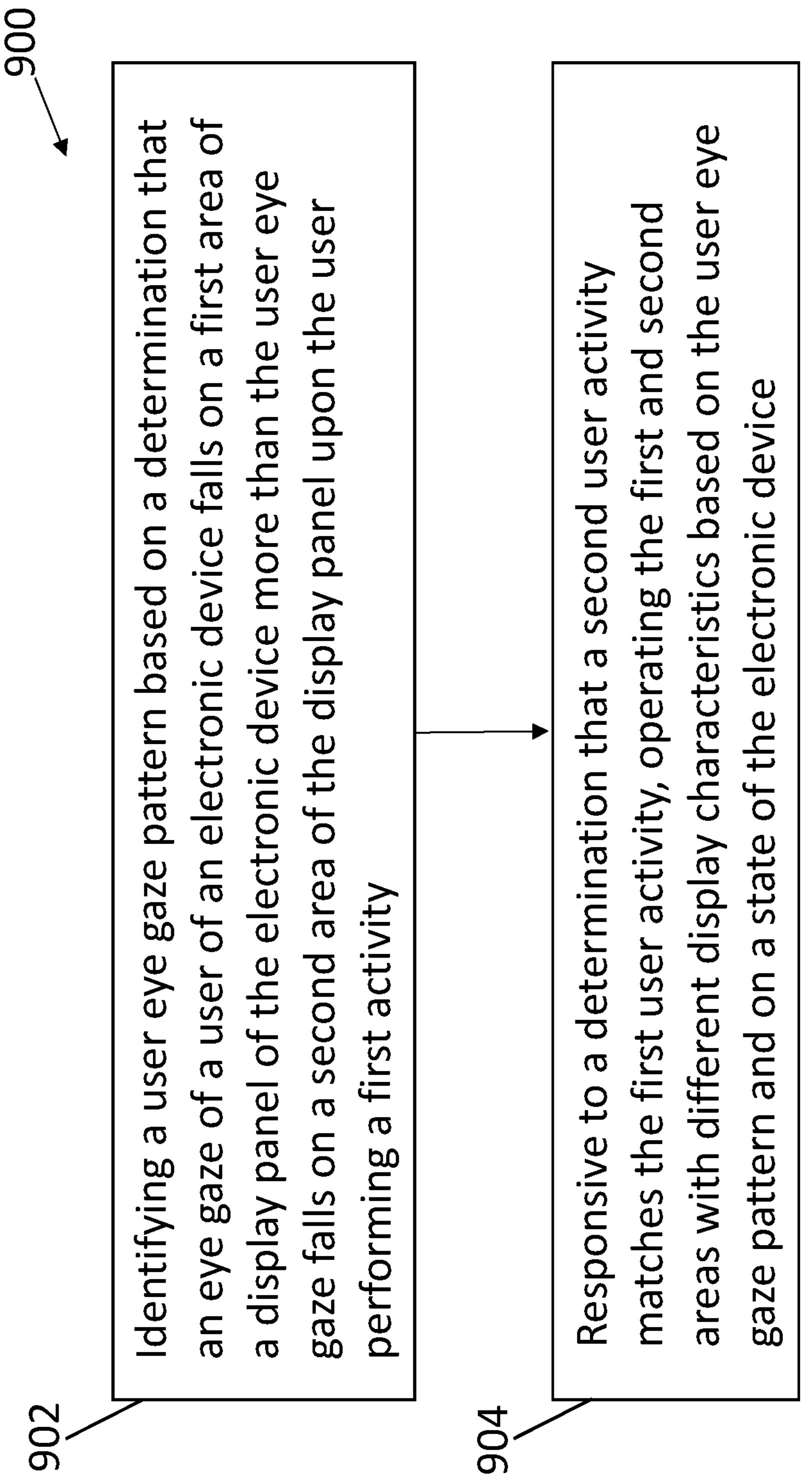
FIG. 9 is a flow diagram of a method for operating a display panel based on eye gaze patterns, in accordance with various examples.

FIG. 9 is a flow diagram of a method 900 for operating a display panel based on eye gaze patterns, in accordance with various examples. The method 900 may be performed, for example, by any of the electronic devices described herein. The method 900 begins by identifying a user gaze pattern based on a determination that an eye gaze of a user of an electronic device falls on a first area of a display panel of the electronic device more than the user eye gaze falls on a second area of the display panel upon the user performing a first activity (902). The method 900 also includes, responsive to a determination that a second user activity matches the first user activity, operating the first and second areas with different display characteristics based on the user eye gaze pattern and on a state of the electronic device (904). A state of an electronic device, as used herein, means a condition of the electronic device in particular (e.g., application being used, battery level, tilt of a display panel, settings of the electronic device, whether the electronic device is receiving mains power, a distance of the user from the display panel) as opposed to a condition external to the electronic device (e.g., ambient light levels, distance of user from electronic device).

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing executable code which, when executed by a processor of an electronic device, causes the processor to:
- during a training period, monitor a user eye gaze to identify areas of a display panel of the electronic device on which the user eye gaze tends to focus while simultaneously monitoring first conditions of the electronic device, and determine and store a relationship between a user eye gaze pattern based on the identified areas, the first conditions of the electronic device, and target display characteristics of the electronic device, the target display characteristics including a set of preferred display parameters corresponding to the first conditions;
- identify second conditions of the electronic device;
- determine whether the second conditions match the first conditions; and
- responsive to the second conditions matching the first conditions, access the stored eye gaze pattern corresponding to the first conditions and selectively operate a display panel of the electronic device to use the target display characteristics according to the accessed user eye gaze pattern, the first and second conditions being operational conditions of the electronic device.

2. The computer-readable medium of claim 1, wherein the first conditions include an application being accessed by the user.

3. The computer-readable medium of claim 1, wherein the first conditions include a state of the electronic device.

4. The computer-readable medium of claim 3, wherein the state of the electronic device includes an application being used, a battery level of the electronic device, a tilt of the display panel, settings of the electronic device, whether the electronic device is receiving mains power, or a combination thereof.

5. The computer-readable medium of claim 1, wherein the target display characteristics include a target brightness level.

6. The computer-readable medium of claim 1, wherein the executable code causes the processor to selectively operate the display panel by applying differing display characteristics to different areas of the display panel.

7. The computer-readable medium of claim 1, wherein the executable code causes the processor to, during a training period, monitor a user eye gaze over a period of time and monitor the first conditions, determine and store the relationship between the user eye gaze pattern and the first conditions using a machine learning technique.

8. The computer-readable medium of claim 7, wherein the executable code causes the processor to, after the training period: monitor the second conditions, determine whether the second conditions match the first conditions, and selectively operate the display panel.

9. The computer-readable medium of claim 1, wherein the processor is to, responsive to the user switching from a first application corresponding to the first conditions to a second application corresponding to the second conditions, access a second stored user eye gaze pattern corresponding to the second application and selectively operate different areas of the display panel with display characteristics according to the second stored user eye gaze pattern.

10. A method comprising:

during a training period, monitoring a user eye gaze to identify areas of a display panel of an electronic device on which the user eye gaze focuses while simultaneously monitoring user activities performed using the electronic device;

identifying a user eye gaze pattern relationship based on a determination that a past eye gaze of a user of the electronic device falls on a first area of the display panel of the electronic device more than the user eye gaze falls on a second area of the display panel upon the user performing a first user activity using the electronic device;

cross-referencing the user eye gaze pattern relationship with target display characteristics of the electronic device, the target display characteristics including a set of preferred display parameters corresponding to the first user activity; and responsive to a determination that a second user activity performed by the user using the electronic device matches the first user activity, accessing the stored user eye gaze pattern relationship corresponding to the first user activity and operating the first and second areas to use the target display characteristics according to the accessed user eye gaze pattern relationship and on a state of the electronic device.

11. The method of claim 10, wherein the target display characteristics include a target brightness level.

12. The method of claim 10, wherein the display characteristics for the first and second areas include different contrasts, refresh rates, color calibrations, hues, saturations, or a combination thereof.

13. The method of claim 10, wherein the state of the electronic device includes an application being used, a battery level of the electronic device, a tilt of the display panel, settings of the electronic device, whether the electronic device is receiving mains power, or a combination thereof.

14. The method of claim 10, wherein the operation of identifying the user gaze pattern relationship is performed during a training period using a machine learning technique, and the operation of operating the first and second areas to use the target display characteristics is performed after the training period.

15. The method of claim 10, wherein the target display characteristics are generated using a machine learning technique.

16. An electronic device, comprising:

an image sensor to capture a user eye gaze pattern;

a display panel; and a processor to:

during a training period, monitor the user eye gaze pattern to identify areas of the display panel on which a user eye gaze focuses while simultaneously monitoring operational conditions of the electronic device;

determine a relationship between past operational conditions of the electronic device and past features of the user eye gaze pattern, the past features identifying the areas of the display panel on which the user eye gaze focused under the past operational conditions;

cross-reference the relationship with target display characteristics of the electronic device, the target display characteristics including a set of preferred display parameters corresponding to the past operational conditions;

responsive to current operational conditions of the electronic device matching the past operational conditions, access the stored user eye gaze pattern corresponding to the past operational conditions; and operate different areas of the display panel with different display characteristics according to the accessed user eye gaze pattern to cause current display parameters to match the preferred display parameters based on the relationship between the past operational conditions of the electronic device and the past features of the user eye gaze pattern.

17. The electronic device of claim 16, wherein the operational conditions of the electronic device include a state of the electronic device.

18. The electronic device of claim 17, wherein the operational conditions of the electronic device include an application being used, a battery level of the electronic device, a tilt of the display panel, settings of the electronic device, whether the electronic device is receiving mains power, or a combination thereof.

19. The electronic device of claim 16, wherein the different display characteristics include different brightness levels.

20. The electronic device of claim 16, wherein the different display characteristics include different contrasts, refresh rates, color calibrations, hues, saturations, or a combination thereof.

21. The electronic device of claim 16, wherein the processor is to determine the relationship between the past operational conditions of the electronic device and the past features of the user eye gaze pattern using a machine learning technique.

* * * * *